(12) United States Patent  (10) Patent No.: US 7,449,795 B2
Nelson  (45) Date of Patent: Nov. 11, 2008

(54) ELECTRIC POWER GENERATION SYSTEM USING A PERMANENT MAGNET DYNAMOELECTRIC MACHINE FOR STARTING A COMBUSTION TURBINE AND FOR GENERATING UNINTERRUPTIBLE EXCITATION POWER

(75) Inventor: Robert J. Nelson, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 156 days.

(21) Appl. No.: 11/197,953

(22) Filed: Aug. 5, 2005

(65) Prior Publication Data

US 2007/0029804 A1   Feb. 8, 2007

(51) Int. Cl.
F01D 41/00   (2006.01)

(52) U.S. Cl. .............................. 290/52; 290/46; 290/47; 290/38; 290/51

(58) Field of Classification Search .................. 290/52, 290/51, 46, 47, 48
See application file for complete search history.

(56) References Cited

U.S. PATENT DOCUMENTS

| 3,998,052 | A |   | 12/1976 | Easter |
| RE29,579 | E |   | 3/1978 | Simon |
| 4,862,009 | A |   | 8/1989 | King |
| 5,180,923 | A | * | 1/1993 | Tyler ........................ 290/40 C |
| 5,387,859 | A |   | 2/1995 | Murugan et al. |
| 5,537,025 | A |   | 7/1996 | Kern et al. |
| 5,581,168 | A |   | 12/1996 | Rozman et al. |
| 5,929,537 | A |   | 7/1999 | Glennon |
| 6,069,808 | A | * | 5/2000 | Panahi et al. .................. 363/98 |
| 6,093,975 | A | * | 7/2000 | Peticolas ..................... 290/52 |
| 6,178,733 | B1 |  | 1/2001 | Nelson |
| 6,274,945 | B1 | * | 8/2001 | Gilbreth et al. ............... 290/52 |
| 6,285,089 | B1 |  | 9/2001 | Nelson |
| 6,323,625 | B1 |  | 11/2001 | Bhargava |
| 6,605,928 | B2 |  | 8/2003 | Gupta et al. |
| 6,664,654 | B2 |  | 12/2003 | Wall et al. |
| 6,762,512 | B2 |  | 7/2004 | Nelson |
| 6,791,204 | B2 | * | 9/2004 | Sarlioglu et al. .............. 290/52 |
| 6,838,778 | B1 | * | 1/2005 | Kandil et al. .................. 290/31 |
| 6,847,129 | B2 |  | 1/2005 | McKelvey et al. |
| 2004/0070373 | A1 |  | 4/2004 | Nelson et al. |
| 2004/0080300 | A1 |  | 4/2004 | Xu et al. |

* cited by examiner

*Primary Examiner*—Nicholas Ponomarenko
*Assistant Examiner*—Iraj A Mohandesi

(57) ABSTRACT

An electric power generation system 10 with a combustion turbine 12 as a prime mover for a main generator 16 is provided. The power generation system includes a dynamoelectric machine 30 that may be used both as the starting motor and as a generator to provide a source of excitation power that is essentially independent of a local power system and thereby not susceptible to voltage fluctuations and/or power interruptions.

8 Claims, 2 Drawing Sheets

ELECTRIC POWER GENERATION SYSTEM USING A PERMANENT MAGNET DYNAMOELECTRIC MACHINE FOR STARTING A COMBUSTION TURBINE AND FOR GENERATING UNINTERRUPTIBLE EXCITATION POWER

FIELD OF THE INVENTION

The present invention relates generally to electrical power generation systems, and, more particularly, to an electric power generation system that uses a combustion turbine as a prime mover.

BACKGROUND OF THE INVENTION

In an electric power generation system that uses a combustion or gas turbine as a prime mover, a pressurized combustible fluid, such as propane, natural gas, kerosene or jet fuel, supplies energy to drive a plurality of turbine blades mounted on a turbine shaft. Air is compressed in a compressor stage and then directed to a combustion stage. Here the fuel mixes with the pressurized air and burns, with a resulting flow of high-pressure, high-velocity gas directed to the turbine blades, rotating the turbine to extract energy from the combustion process. The turbine shaft is axially connected to a generator shaft as a common shaft, and thus rotation of the turbine shaft imparts rotational energy to the generator shaft for producing electricity. Combustion turbine/generator combinations are available with various power output ratings and thus can be used to supply power for various applications, such as an industrial facility or an electrical power grid. Gas turbines are also used as aircraft engines.

It is known that gas turbines are not self-starting machines. For example, a separate starting apparatus may be connected to the common shaft of the combustion turbine generator to provide the starting rotational energy until the gas turbine reaches a desired rotational speed. The starter apparatus may then be disconnected and the combustion process supplies the energy to drive the turbine. The starting apparatus may include a starter motor; such as a DC (direct current) motor connectable to the common shaft through a transmission, and may include a clutch and/or torque converter in order to achieve a high starting torque. Typically, known electric starter apparatuses used for this type of application are operable just at a constant speed, hence the need of the transmission to develop the required high starting torques. It is also known that the starting apparatus may be in the form of a hydraulic starter, such as made up of a hydraulic motor responsive to a pressurized motive fluid as may be supplied under control of a hydraulic control system. It is noted that regardless of the specific implementation, such known starter arrangements are relatively expensive, consume valuable plant space and add incremental costs to the operation and maintenance of an electric power generation plant.

It is also known that because of its size and considerable weight, the rotatable turbine shaft of large combustion turbines may be susceptible to bowing if such shaft were to remain in one position for an extended period. One common technique used to overcome this problem that in the case of an electrically-driven starter may require use of an additional motor, such as a turning AC (alternating current) motor (generally referred to as a turning gear because the motor output is supplied to the turbine shaft via a gear box) for turning the shaft at a relative slow speed (e.g., 3 rpm) when the turbine/generator is not operating. This multi-motor arrangement may be employed since the starting torque required to rotate the turbine shaft from rest is much greater than the torque required to keep the shaft in rotation. For example, the electric motor starter may be sized for supplying the maximum torque requirement at starting and then the turning motor may be used to supply the torque required to keep the shaft just in relatively slow rotation. Needles to say, the foregoing arrangement exacerbates the issues noted above regarding costs and size of known starter arrangements.

BRIEF DESCRIPTION OF THE DRAWINGS

The foregoing and other features of the invention will be apparent from the following more particular description of the invention, as illustrated in the accompanying drawings. The drawings are not necessarily drawn to scale or to illustrate inconsequential minutia, emphasis instead being placed upon illustrating the basic principles of aspects of the invention.

DETAILED DESCRIPTION OF THE INVENTION

Figure 1:
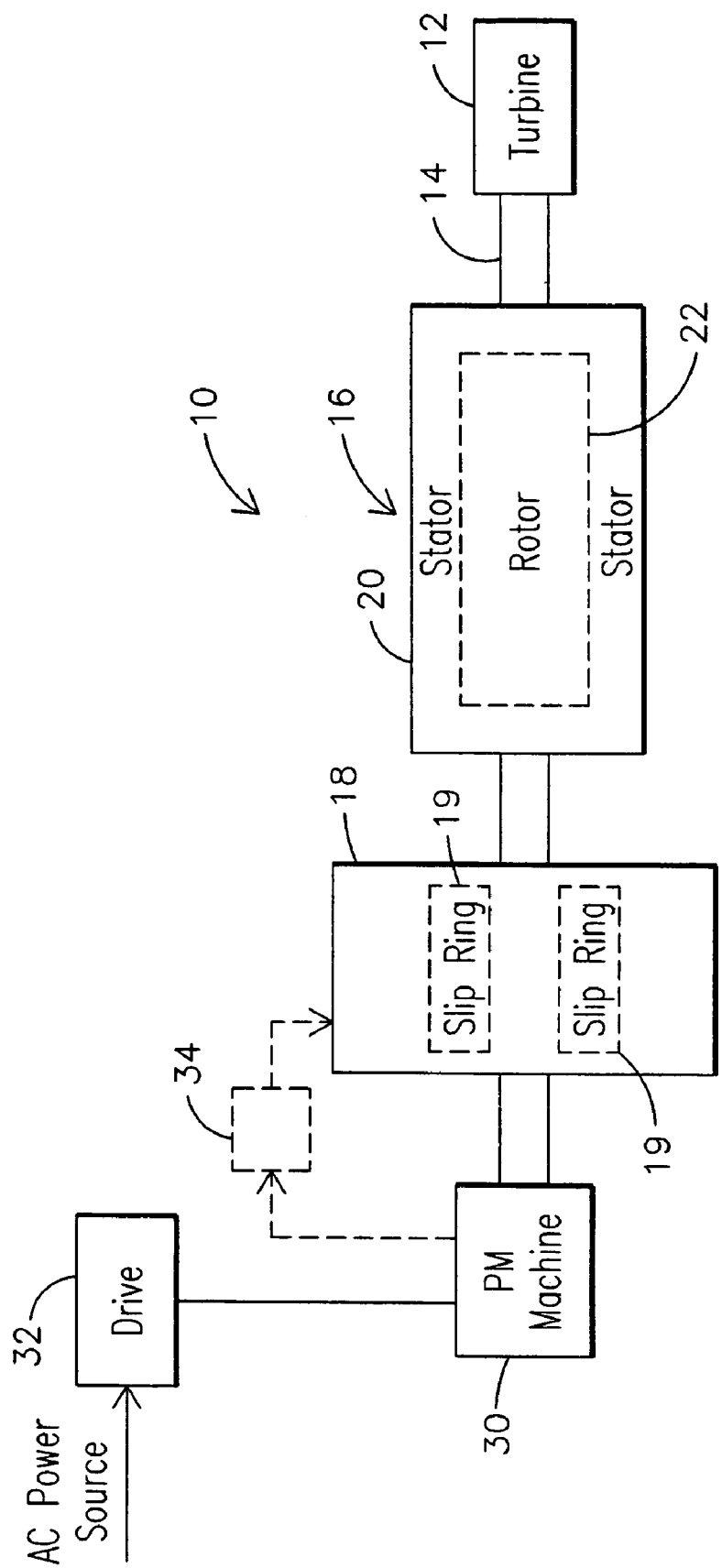
FIG. 1 is a block diagram of one exemplary electric power generation system embodying aspects of the present invention.
Figure 2:
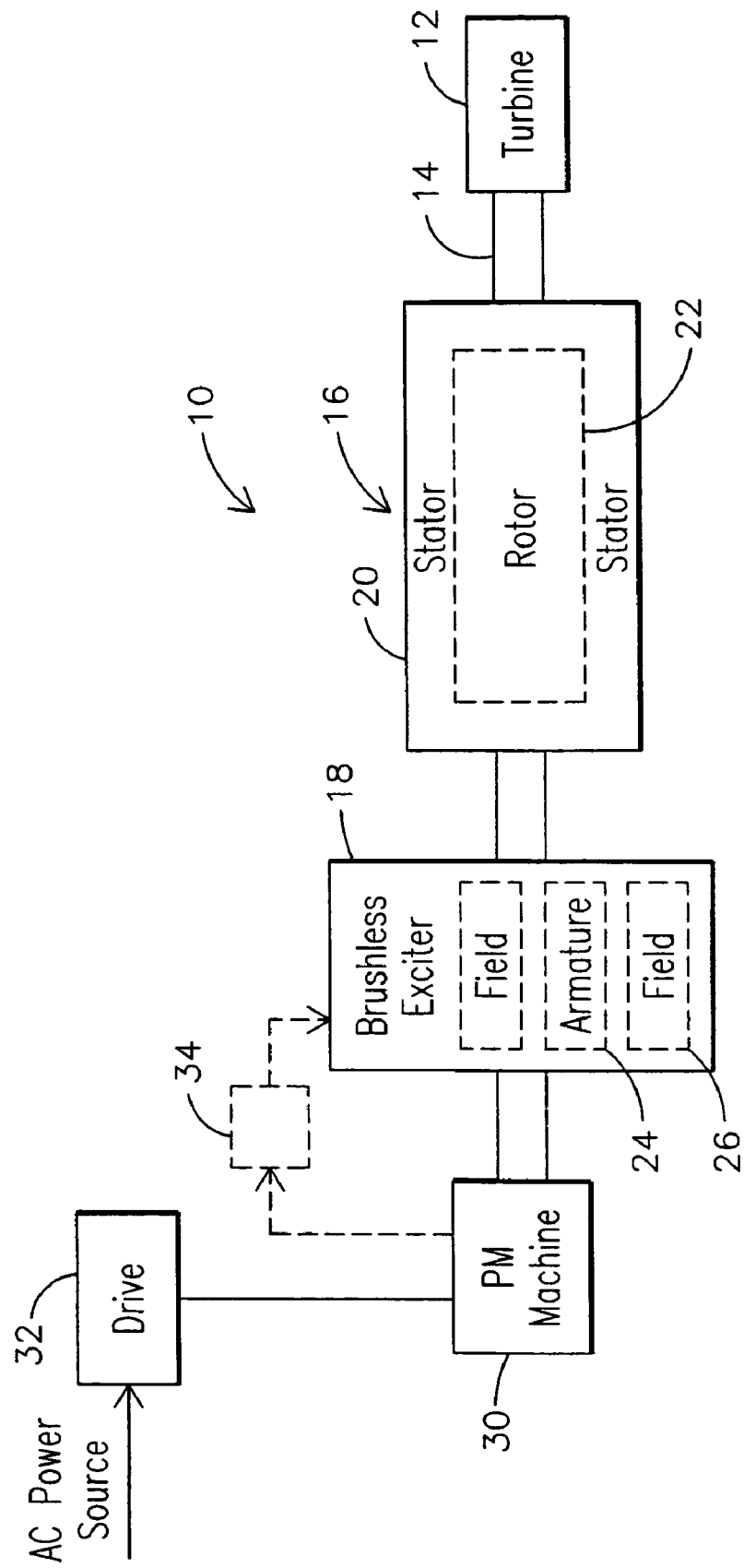
FIG. 2 is a block diagram of another exemplary electric power generation system embodying aspects of the present invention.

FIG. 1 is a block diagram of one exemplary electric power generation system 10 embodying aspects of the present invention. The electric power generation system 10 includes a combustion turbine 12 having a common shaft 14. The electric power generation system 10 also includes a generator 16 (main generator) connected to combustion turbine 12 along common shaft 14. An exciter device 18 may be connected to the generator as described below. The exciter device may be used in lieu of a static excitation system where slip rings are utilized for conducting a field current to the generator rotor. In this case, as illustrated in FIG. 1, the exciter device would essentially be a conduit comprising one or more slip rings 19 for carrying the excitation current, as generated by a permanent magnet machine 30, to the main generator. The exciter device may also be in the form of a brushless DC-field exciter, as illustrated in FIG. 2.

As will be understood by those skilled in the art, generator 16 comprises one or more stator windings 20 and a rotating field winding 22. Current is supplied to the field winding 22 from (or through) exciter device 18 for inducing current flow in the stator windings 20 as the magnetic field of the rotating field winding cuts across the stator windings. For example, a three-phase alternating current output is supplied from a generator having three independent stator windings spaced at 120-degree intervals around the stator shell. Single phase AC is supplied from a single stator winding.

As will be also understood by those skilled in the art, regardless of the specific type of excitation system that is used, the excitation system has been traditionally connected to an external power source. For example, as shown in FIG. 2, a brushless exciter device may provide a rotating armature winding 24 on the same turbine-driven shaft as the generator 16, and a stationary field winding 26 responsive to an externally generated DC current. It is noted that in prior implementations, this externally generated DC current may be commonly supplied by a power source connected to a power grid. Accordingly, this power source may be vulnerable to voltage fluctuations (e.g., sags) and/or power interruptions that can occur in the power grid and this can affect reliable and uninterrupted operation of the electric power generation system. As will be elaborated in greater detail below, aspects of the present invention, offer an innovative and cost-effective solution to this vulnerability.

As the exciter armature winding 24 rotates through the stationary magnetic field of the exciter field winding 26, an AC current is induced in the former. The AC current may be converted to a DC current by a rectifier bridge, and the resulting DC current is supplied to the generator field winding 22 through conductors that may be mounted on the rotating shaft. Thus, the exciter provides direct current (DC) to the rotating field winding of the main generator. This exciter DC output is regulated to control the intensity of the magnetic field developed by the main generator field winding. Since the generator stator winding 20 is responsive to this magnetic field, the DC input to the generator rotating field winding controls the generator 16 AC output. The description provided so far essentially describes conventional aspects of the electric power generation system 10 and is intended to provide background information regarding aspects of the operational environment of the present invention.

The inventor of the present invention has innovatively recognized that one may use a dynamoelectric machine 30, such as permanent magnet machine, to perform multiple functions, as will be described in greater detail below, regarding functional and operational aspects of the power generation system. It is contemplated that this can result in substantial savings (both in terms of economics savings and real estate savings) over known starter apparatuses.

For example, a 200 MW turbine may require a starting motor capable of providing approximately several MW of power at least on a short-term basis, 80% of this power may be required on a longer-term basis. As previously noted, prior to the present invention this has generally required one or two turning gear motors—a low power (<50 kW) dc motor for low speed rotation and, in some cases, an ac motor of considerably higher rating for higher speeds for turning gear operation. These motors are typically interfaced to the generator or turbine via a flexible coupling and a fluid-coupling torque converter. In one known implementation, each of this equipment is provided on a starter skid. The skid is effectively disconnected and serves no useful function while the turbine is operating. The only functionality provided by this known starter skid occurs during startup and when the turbine is out of service (when the turning gear is operating). The skid and coupling is several meters long and adds considerably to the turbine deck length and cost of the plant. Additionally, in such an application, a static excitation system is commonly provided, which draws power from the local system via an excitation or auxiliary transformer and is susceptible to voltage fluctuations and power interruptions because of faults in the local power system. To overcome this, the static excitation system is typically oversized, often by a factor of two or more.

The inventor of the present invention has innovatively recognized that a PM motor previously used just for starting the turbine has about the same capability when used as a generating source, as the main generator (e.g., a synchronous generator) requires for excitation subsequent to performing start of the turbine. Thus, aspects of the present invention advantageously recognize the ability of using permanent magnet dynamoelectric machine both as the starting motor and as a generator to be a source of field excitation that is independent of the local power system and not susceptible to voltage fluctuations and/or power interruptions. The excitation power can be supplied to the main generator either via the exciter field (for a brushless exciter application) or via slip rings for a static exciter application.

The dynamoelectric machine 30 is connected to the combustion turbine 12 and the generator 16 along the common shaft 14. A drive 32 is electrically coupled to the dynamoelectric machine 30. In one exemplary embodiment, the drive is configured to generate a signal for causing motoring action in dynamoelectric machine 30. More particularly, the signal for driving the dynamoelectric machine may be a variable frequency signal. This allows dynamoelectric machine 30 to operate as a starter for starting the combustion turbine from an initial condition (e.g., 0 RPM) to a desired rotational speed (e.g., 1500 RPM) without the need of any transmission or torque converter.

Furthermore, the dynamoelectric machine 30 can be used (in lieu of a turning gear) for turning the common shaft at a relative slow speed (e.g., in a range from approximately 3 rpm to approximately 150 rpm) when the turbine/generator is not being used to supply power and thus reduce the tendency of the shaft to warp. In one exemplary embodiment, drive 32 may be a three-phase inverter or a three-phase cycloconverter. As will be appreciated by those skilled in the art, a cycloconverter directly converts AC power at one frequency to AC power at another frequency, and an inverter changes a DC input voltage to an AC output voltage of a desired magnitude and/or frequency. For readers desirous of background information regarding principles of electric power control directed to relatively high power applications, reference is made to textbook titled "Power Electronics Circuits, Devices and Applications by M. H. Rashid, $2^{nd}$ Ed., 1993 by Prentice-Hall Inc.

Once combustion turbine 12 reaches an operating condition, dynamoelectric machine 30 is responsive to mechanical energy from combustion turbine 12 passed by the common shaft. This mechanical energy causes an electrical generating action in dynamoelectric machine 30. That is, when the turbine is at rated speed, dynamoelectric machine 30 can be used as a permanent magnet generator. This allows the dynamoelectric machine 30 to operate as a power source than may be used for providing a supply of electrical power to a brushless exciter device or to eliminate a static exciter system since in this case, when dynamoelectric machine 30 operates in a generating mode, the machine 30 essentially constitutes the excitation source for the main generator. That is, dynamoelectric machine 30 operates as a current source to the stationary field winding 26, in case of a brushless exciter application, or to the slip rings 19 in case of a static exciter application, and in each case ultimately carrying excitation current to the main generator. Notably in each case, this excitation supply of electrical power is independent of an electrical power grid and is thus free of power voltage sags and interruptions that may occur in the power grid.

It will be appreciated that drive 32 may include circuitry to provide a desired voltage regulation and AC to DC conversion to the alternating current from machine 30 when machine 30 functions as a generator. Optionally, the alternating current from machine 30 can be converted to direct current by, for example, circuitry, such as a diode wheel rectifier 34, independent from drive 30. In either case, a selected level of direct current is supplied to the rotor 20 to excite the main generator as described above.

It is noted that the starting arrangement of the present invention may be conveniently used in combination with a standard static start technique. As will be understood by those skilled in the art, a static start technique refers to techniques where the main generator is operated as a motor for starting the gas turbine. For example, alternating current is supplied to the generator stator winding and alternating current is supplied to the rotating armature from a separate static-start exciter. The AC current is rectified by means of a suitable rectifier to supply direct current to the generator field. The motoring action produced by the interacting magnetic fields drives the main generator, and in turn drives the turbine. By way of example, start-up control of the turbine may be exercised as described above in combination with a permanent magnet machine embodying aspects of the present invention.

It is contemplated that aspects of the present invention (when used to supply excitation power through slip rings) would allow eliminating the static excitation system and may result in a more economically attractive implementation. For example, in a practical implementation, the PM motor/generator may have extra-capacity relative to the needs of a brushless excitation application, but may have just about the needed capacity relative to the needs of a static excitation application. Moreover, static excitation systems tend to be more susceptible to power disturbances in local power as compared to brushless excitation systems. Thus, although aspects of the present invention can be advantageously used for either a brushless or for a static excitation application, it is believed that a preferred application in view of the foregoing considerations (not necessarily in view of technological considerations) may be in the context of a static excitation application.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope thereof. Therefore, it is intended that the invention not be limited to the particular embodiment disclosed as the best mode contemplated for carrying out this invention, but that the invention will include all embodiments falling within the scope of the appended claims.

I claim:

1. An electric power generation system comprising:
a combustion turbine;
a main generator connected to the combustion turbine along a common shaft;
an exciter device connected to the main generator;
a dynamoelectric machine connected to the combustion turbine and the main generator along the common shaft; and
a drive electrically coupled to the dynamoelectric machine, said drive being configured to generate a variable frequency signal for causing motoring action in said dynamoelectric machine, wherein said dynamoelectric machine operates as a starter for starting the combustion turbine from an initial condition to a desired rotational speed, upon said combustion turbine reaching an operating condition, said dynamoelectric machine being responsive to mechanical energy from the combustion turbine passed by the common shaft, said mechanical energy causing an electrical generating action in said dynamoelectric machine, wherein said dynamoelectric machine operates as a power source for providing a supply of electrical power to said exciter device, said supply of electrical power being independent of an electrical power grid.

2. The electric power generation system of claim 1 wherein said dynamoelectric machine comprises a permanent magnet dynamoelectric machine.

3. The electric power generation system of claim 1 wherein said dynamoelectric machine constitutes the exciter device for a static exciter application.

4. The electric power generation system of claim 1 wherein said exciter device comprises a DC brushless exciter device.

5. The electric power generation system of claim 1 wherein said drive is selected from the group consisting of an inverter and a cycloconverter.

6. The electric power generation system of claim 1 further comprising a converter for converting an AC current generated by said dynamoelectric machine to a DC excitation current, wherein said excitation current is supplied to a field winding of said exciter device.

7. The electric power generation system of claim 1 further comprising a rectifier for rectifying an AC current generated by said dynamoelectric machine to a DC excitation current, wherein said excitation current is supplied to a field winding of said exciter device.

8. The electric power generation system of claim 1 wherein said dynamoelectric machine is operable as a turning motor for rotating the common shaft during non-operational periods of the turbine at a desired rotational speed in a range from approximately 3 rpm to approximately 150 rpm.

* * * * *